United States Patent
Sato

(10) Patent No.: US 8,750,628 B2
(45) Date of Patent: Jun. 10, 2014

(54) PATTERN RECOGNIZER, PATTERN RECOGNITION METHOD AND PROGRAM FOR PATTERN RECOGNITION

(75) Inventor: Atsushi Sato, Tokyo (JP)

(73) Assignee: NEC Corporation, Tokyo (JP)

( * ) Notice: Subject to any disclaimer, the term of this patent is extended or adjusted under 35 U.S.C. 154(b) by 188 days.

(21) Appl. No.: 13/521,227

(22) PCT Filed: Dec. 20, 2010

(86) PCT No.: PCT/JP2010/007360
§ 371 (c)(1),
(2), (4) Date: Jul. 10, 2012

(87) PCT Pub. No.: WO2011/086643
PCT Pub. Date: Jul. 21, 2011

(65) Prior Publication Data
US 2013/0129220 A1    May 23, 2013

(30) Foreign Application Priority Data
Jan. 14, 2010   (JP) .................................. 2010-005447

(51) Int. Cl.
*G06K 9/62* (2006.01)
(52) U.S. Cl.
USPC .......................................... 382/224; 382/159
(58) Field of Classification Search
None
See application file for complete search history.

(56) References Cited

U.S. PATENT DOCUMENTS

| 5,754,681 A | 5/1998 | Watanabe et al. |
| 2003/0200188 A1* | 10/2003 | Moghaddam .................. 706/25 |
| 2009/0132447 A1* | 5/2009 | Milenova et al. .............. 706/12 |

FOREIGN PATENT DOCUMENTS

| JP | H08-106295 | * 2/1996 | ............... G06K 9/62 |
| JP | 08-087572 | 4/1996 | |
| JP | 08-106295 | 4/1996 | |

OTHER PUBLICATIONS

Li et al, "Feature selection based on loss—margin of nearest neighbor classification," 2009, Pattern Recognition 42, pp. 1914-1921.*

(Continued)

*Primary Examiner* — Bhavesh Mehta
*Assistant Examiner* — David F Dunphy
(74) *Attorney, Agent, or Firm* — Young & Thompson

(57) ABSTRACT

A loss calculation element calculates a loss of a feature vector for each class, the feature vector indicating a feature of data belonging to the class. A loss difference calculation element calculates a sum of differences of losses between the classes based on the loss calculated for each class. A recognition dictionary creation element creates a recognition dictionary based on a total sum of losses calculated for the classes and the total sum of loss differences between the classes. The recognition dictionary creation element corrects, on a basis of an input feature vector, a recognition dictionary so as to minimize a sum of the total sum of losses for the classes calculated by the loss calculation element and the total sum of loss differences between the classes calculated by the loss difference calculation element, and the pattern classification element classifies a pattern of data using the corrected recognition dictionary.

7 Claims, 14 Drawing Sheets

(56) References Cited

OTHER PUBLICATIONS

Sun et al, "A Maximum Class Distance Support Vector Machine," 2008, Fourth International Conference on Natural Computation, pp. 13-17.*

Tatsumi et al, "Multiobjective Multiclass Soft-Margin Support Vector Machine Maximizing Pair-Wise Interclass Margins," 2009, ICONIP 2008, Part I, LNCS 5506, pp. 970-977.*

Corinna Cortes and Vladimir Vapnik, "Support-Vector Networks", Machine Learning, vol. 20, pp. 273-297, 1995.

Shotaro Akaho, "Kernel Machine", IEICE Technical Report, Jul. 22, 2003, vol. 103, No. 228, pp. 1-6.

Norikazu Takahashi, "Support Vector Machine and its Efficient Learning Algorithms", IPSJ SIG Notes, Sep. 25, 2007, vol. 2007, No. 96, pp. 49-54.

International Search Report PCT/JP2010/007360 dated Feb. 15, 2011, with English translation.

* cited by examiner

PATTERN RECOGNIZER, PATTERN RECOGNITION METHOD AND PROGRAM FOR PATTERN RECOGNITION

TECHNICAL FIELD

The present invention relates to pattern recognizers, pattern recognition methods and programs for pattern recognition to recognize a pattern of input data as well as recognition dictionary creation devices, recognition dictionary creation methods and programs for recognition dictionary creation to create a recognition dictionary used for the pattern recognition.

BACKGROUND ART

Known typical methods to categorize input data into two groups include techniques described in Patent Literature (PTL) 1 and Non Patent Literature (NPL) 1.

A soft margin classification system described in PTL 1 is configured to determine parameters including a weight vector and a bias in every data vector of a training set and determine a minimum non-negative value of slack variables for each data vector on the basis of a plurality of constraints. The soft margin classification system described in PTL 1 is configured to determine a minimum value of a cost function so as to satisfy a plurality of constraints.

A method described in NPL 1 is to, when input data cannot be linearly separated, map a pattern into a finite or an infinite dimensional feature space, and to perform linear separation on the feature space.

CITATION LIST

Patent Literature

PTL 1: Japanese Patent Application Laid-Open No. 8-087572 (1996) (paragraph 0009)

Non Patent Literature

NPL 1: C. Cortes and V. N. Vapnik, "Support vector Networks," Machine Learning, vol. 20. pp. 273-297, 1995

SUMMARY OF INVENTION

Technical Problem

The following describes a typical pattern recognizer using a classification method described in PTL 1 and NPL 1. FIG. 17 illustrates a typical pattern recognizer. The pattern recognizer illustrated in FIG. 17 includes a data input section 201, a feature extraction section 202, a recognition dictionary creation section 203, a classification section 206 and a result output section 208. The recognition dictionary creation section 203 includes a loss calculation section 204 and a margin calculation section 205.

At the stage called learning to create a recognition dictionary, the feature extraction section 202 converts data input from the data input section 201 into a d dimensional feature vector, and the recognition dictionary creation section 203 creates a recognition dictionary 207. At the stage to recognize data, the feature extraction section 202 converts data input from the data input section 201 into a d dimensional feature vector, and the classification section 206 classifies the data using the recognition dictionary 207, and thereafter the result output section 208 outputs a classification result.

Herein, the recognition dictionary creation section 203 creates the recognition dictionary 207 in such a manner that an evaluation function is minimized, the evaluation function being obtained by adding the loss calculated by the loss calculation section 204 and the reciprocal of a margin calculated by the margin calculation section 205.

FIG. 18 illustrates the processing to create a recognition dictionary from data that can be linearly separated. Firstly, the case where a data set can be linearly separated is described with reference to FIG. 18. A black dot of FIG. 18 (hereinafter described as "●") indicates data belonging to a negative class and an open circle (hereinafter described as "○") indicates data belonging to a positive class. In a typical pattern recognizer, parallel margin boundaries (i.e., a solid line 302 and a solid line 303) having the maximum margin between the negative data and the positive data are found, and a recognition dictionary is created so that a broken line 301 located at an equal distance therefrom is used as the decision boundary.

Next, the case where a data set cannot be linearly separated is described with reference to FIG. 19. FIG. 19 illustrates the processing to create a recognition dictionary from data that cannot be linearly separated. Similarly to FIG. 18, a solid line 402 and a solid line 403 are parallel margin boundaries, and a broken line 401 is a decision boundary located at an equal distance therefrom. However, unlike the case of FIG. 18, data 406, 407 surrounded by squares are contained in the data set, and therefore the data cannot be linearly separated.

In the case where a data set cannot be linearly separated like this, the recognition dictionary creation section 203 of the typical pattern recognizer calculates, as a loss, the total sum of a deviation amount 404 from the margin boundary (i.e., the solid line 402) of the data indicated as "●" and a deviation amount 405 from the margin boundary (i.e., the solid line 403) of the data indicated as "○". Then, the recognition dictionary creation section 203 creates a recognition dictionary having a margin boundary and a decision boundary so that this loss can be minimized and a margin can be maximized. At this time, the recognition dictionary creation section 203 finds the decision boundary so as to minimize a value L defined by Expression 1.

[Math 1]

$$L = \frac{1}{(\text{Margin})^2} + C \times (\text{Loss}) \quad \text{(Expression 1)}$$

A factor C in Expression 1 is a parameter to determine balance between a margin and a loss, and a value of the factor may be determined by trial and error using cross-validation or the like.

In the method of classifying input data into groups using a typical pattern recognizer, however, when data used for learning contains noise or the number of data is small, there is a problem that classification precision for not-learned new data deteriorates. Referring to FIG. 20 and FIG. 21, this problem is described below. FIG. 20 illustrates the case where data cannot be linearly separated.

Data 504 of FIG. 20 is data located at a position away from the original distribution due to noise or data that appears to be away from the distribution because of the small number of data. In such a case, a typical pattern recognizer sets a decision boundary (a broken line 501) at an equal position from a solid line 502 and a solid line 503 that maximize a margin between data.

The following describes the case where not-learned new data is added to the data set of FIG. 20. FIG. 21 illustrates the case where not-learned new data is added to the data set of FIG. 20. When a decision boundary is set at a position of a broken line 602 of FIG. 21, the number of errors of data indicated as "○" becomes 1 and the number of errors of data indicated as "●" becomes 1, and so the total number of errors becomes 2. In the method used by a typical pattern recognizer, however, since a decision boundary is set at the position of a broken line 601, the number of errors of data indicated as "○" becomes 3 (i.e., the total number of errors becomes 3), and therefore the classification precision unfortunately deteriorates. In this way, even when data used for learning contains noise or the number of data is small, high-degree of classification precision for not-learned new data is desired.

To cope with this, it is an exemplary object of the present invention to provide a pattern recognizer, a pattern recognition method and a program for pattern recognition capable of performing pattern recognition of not-learned new data with high degree of classification precision even when data used for learning contains noise or the number of data is small as well as to provide a recognition dictionary creation device, a recognition dictionary creation method and a program for recognition dictionary creation to create a recognition dictionary used for the pattern recognition.

Solution to Problem

A pattern recognizer according to the present invention includes: loss calculation means that calculates a loss of a feature vector for each class, the feature vector indicating a feature of data belonging to the class; loss difference calculation means that calculates a total sum of differences of losses between the classes on a basis of the loss calculated for each class; recognition dictionary creation means that creates a recognition dictionary on a basis of a total sum of losses calculated for the classes by the loss calculation means and the total sum of differences of losses between the classes; and pattern classification means that classifies a pattern of data using the recognition dictionary. The recognition dictionary creation means corrects, on a basis of an input feature vector, a recognition dictionary so as to minimize a sum of the total sum of losses for the classes calculated by the loss calculation means and the total sum of differences of losses between the classes calculated by the loss difference calculation means, and the pattern classification means classifies a pattern of data using the corrected recognition dictionary.

A recognition dictionary creation device according to the present invention creates a recognition dictionary that a pattern recognizer uses, the pattern recognizer being configured to recognize a pattern of data. The recognition dictionary creation device includes: loss calculation means that calculates a loss of a feature vector for each class, the feature vector indicating a feature of data belonging to the class; loss difference calculation means that calculates a total sum of differences of losses between the classes on a basis of the loss calculated for each class; and recognition dictionary creation means that creates a recognition dictionary on a basis of a total sum of losses calculated for the classes by the loss calculation means and the total sum of differences of losses between the classes. The recognition dictionary creation means corrects, on a basis of an input feature vector, a recognition dictionary so as to minimize a sum of the total sum of losses for the classes calculated by the loss calculation means and the total sum of differences of losses between the classes calculated by the loss difference calculation means.

A pattern recognition method according to the present invention includes the steps of: calculating a loss of a feature vector for each class, the feature vector indicating a feature of data belonging to the class; calculating a total sum of differences of losses between the classes on a basis of the loss calculated for each class; creating a recognition dictionary on a basis of a total sum of losses calculated for the classes and the total sum of differences of losses between the classes; correcting, on a basis of an input feature vector, a recognition dictionary so as to minimize a sum of the total sum of losses calculated for the classes and the total sum of differences of losses between the classes, and classifying a pattern of data using the corrected recognition dictionary.

A recognition dictionary creation method according to the present invention is to create a recognition dictionary that a pattern recognizer uses, the pattern recognizer being configured to recognize a pattern of data. The method includes the steps of: calculating a loss of a feature vector for each class, the feature vector indicating a feature of data belonging to the class; calculating a total sum of differences of losses between the classes on a basis of the loss calculated for each class; creating a recognition dictionary on a basis of a total sum of losses calculated for the classes and the total sum of differences of losses between the classes; and correcting, on a basis of an input feature vector, a recognition dictionary so as to minimize a sum of the total sum of losses calculated for the classes and the total sum of differences of losses between the classes.

A pattern recognition program according to the present invention makes a computer execute the following processing, including: loss calculation processing that calculates a loss of a feature vector for each class, the feature vector indicating a feature of data belonging to the class; loss difference calculation processing that calculates a total sum of differences of losses between the classes on a basis of the loss calculated for each class; recognition dictionary creation processing that creates a recognition dictionary on a basis of a total sum of losses calculated for the classes in the loss calculation processing and the total sum of differences of losses between the classes; and pattern classification processing that classifies a pattern of data using the recognition dictionary. In the recognition dictionary creation processing, on a basis of an input feature vector, a recognition dictionary is corrected so as to minimize a sum of the total sum of losses for the classes calculated in the loss calculation processing and the total sum of differences of losses between the classes calculated in the loss difference calculation processing, and in the pattern classification processing, a pattern of data is classified using the corrected recognition dictionary.

A recognition dictionary creation program according to the present invention is applied to a computer configured to create a recognition dictionary that a pattern recognizer uses, the pattern recognizer being configured to recognize a pattern of data. The program makes a computer execute the processing including: loss calculation processing that calculates a loss of a feature vector for each class, the feature vector indicating a feature of data belonging to the class; loss difference calculation processing that calculates a total sum of differences of losses between the classes on a basis of the loss calculated for each class; and recognition dictionary creation processing that creates a recognition dictionary on a basis of a total sum of losses calculated for the classes in the loss calculation processing and the total sum of differences of losses between the classes. In the recognition dictionary creation processing, on a basis of an input feature vector, a recognition dictionary is corrected so as to minimize a sum of the total sum of losses for the classes calculated in the loss calculation processing and the total sum of differences of losses between the classes calculated in the loss difference calculation processing.

Advantageous Effects of Invention

According to the present invention, even when data used for learning contains noise or the number of data is small, pattern recognition of not-learned new data can be performed with high degree of classification precision.

DESCRIPTION OF EMBODIMENTS

The following describes exemplary embodiments of the present invention, with reference to the drawings.

Figure 1:
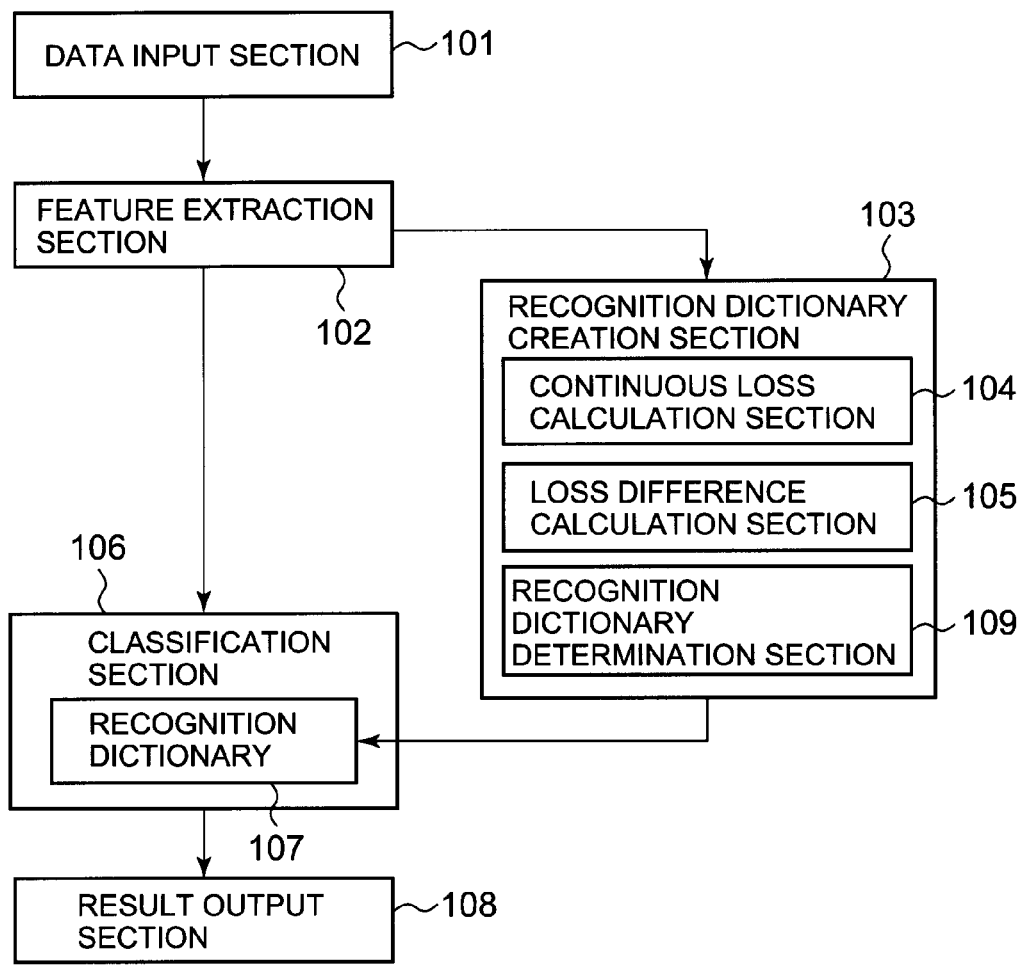
FIG. 1 It depicts a block diagram illustrating one exemplary embodiment of a pattern recognizer according to the present invention.

FIG. 1 is a block diagram illustrating one exemplary embodiment of a pattern recognizer according to the present invention. The pattern recognizer of the present invention includes: a data input section 101; a feature extraction section 102; a recognition dictionary creation section 103; a classification section 106 and a result output section 108. The recognition dictionary creation section 103 further includes a continuous loss calculation section 104, a loss difference calculation section 105 and a recognition dictionary determination section 109.

The data input section 101 informs the feature extraction section 102 of data to be recognized that is input to the pattern recognizer. Examples of the data to be recognized include image data shot by a camera.

The feature extraction section 102 extracts d pieces of feature values (hereinafter this may be described as a d dimensional feature vector) on the basis of the data informed from the data input section 101. One exemplary extraction method performed by the feature extraction section 102 is to convert image data into a monochrome gray image, and then divide the entire image into regions of 10 high×10 wide and find an average of brightness values of the image in each region, whereby a 100 dimensional feature vector can be obtained. The method to extract a multidimensional feature vector by the feature extraction section 102 is not limited to the aforementioned method. Since a method to extract a multidimensional feature vector from input data is widely known, the detailed description thereon is omitted.

At the stage called "learning" to create a recognition dictionary 107, the recognition dictionary creation section 103 inputs the d dimensional feature vector extracted by the feature extraction section 102 into the continuous loss calculation section 104 and the loss difference calculation section 105, and creates the recognition dictionary 107 on the basis of a calculation result thereof.

The continuous loss calculation section 104 calculates a loss for each class on the basis of the d dimensional feature vector. Then, the continuous loss calculation section 104 calculates a total sum of the calculated losses of the classes. In the following description, in order to distinguish from a loss calculated by a typical method, the loss calculated by the continuous loss calculation section 104 is described as a continuous loss.

The loss difference calculation section 105 calculates a difference between a loss of one class and a loss of another class on the basis of the d dimensional feature vector. Then, the loss difference calculation section 105 calculates a total sum of all differences between the classes.

The recognition dictionary determination section 109 determines a recognition dictionary to be created on the basis of the total sum of the continuous losses calculated by the continuous loss calculation section 104 and the total sum of the differences of the losses between the classes calculated by the loss difference calculation section 105.

At the stage to recognize data, the classification section 106 performs classification processing of a data pattern using the d dimensional feature vector extracted by the feature extraction section 102 and the recognition dictionary 107, and informs the result output section 108 of a classification result. For instance, the classification section 106 may classify a pattern of the input data to recognize a class to which the data belongs. Since a classification method using the d dimensional feature vector and the recognition dictionary is widely known, the detailed description thereon is omitted.

The result output section 108 outputs the classification result received from the classification section 106.

Next, the operation by the recognition dictionary creation section 103 is described below in detail. The continuous loss calculation section 104 of the recognition dictionary creation section 103 calculates a continuous loss for a k-th class in accordance with Expression 2 exemplified as follows.

[Math 2]

$$L_k(\vec{\alpha}) = \frac{P_k}{N_k} \sum_{n=1}^{N_k} r(\vec{x}_{kn}; \vec{\alpha})$$ (Expression 2)

$P_k$ in Expression 2 denotes a priori probability for the k-th class, $N_k$ denotes the number of feature vectors belonging to the k-th class, vector $x_{kn}$ denotes the n-th feature vector belonging to the k-th class, and vector α denotes a classifier parameter used as the recognition dictionary 107.

Herein, the priori probability refers to an existence probability or an appearance frequency on data whose answer is known. For instance, let that the number of all data is N, the ratio of data of class k included in the data is the priori probability of class k. As a desired value for the priori probability, a statistically already-known value may be set in advance, for example. For instance, when the number of all feature vectors is N and the number of classes is K, the priori probability of the class k may be set as $P_k = N_k/N$. Herein, $N = N_1 + \ldots N_K$. The priori probability $P_k$ in this case is a ratio of learning data having an answer belonging to the class k to the all learning data.

The classifier parameter refers to a parameter relating to classification defined for a classifier to be used. For instance, when a kernel function is used as the discriminant function, a factor used for weighting of each kernel function may be used as the parameter α exemplified in Expression 2.

Function r exemplified in Expression 2 (hereinafter this may be described as r (•)) represents a risk that a feature vector given as an argument causes a classification error, and as the risk of classification error increases, the function returns a higher value. For instance, a discriminant function $g_k$ (hereinafter this may be described as $g_k$(•)) to calculate a similarity of the k-th class to a feature vector x may be the following function.

$$g_k(\vec{x}_{kn}; \vec{\alpha})$$ [Math 3]

That is, the discriminant function $g_k$ is a function to calculate a larger value as the degree to belong to the k-th class increases. Further, let that a class most likely to cause an error in recognition for vector $x_{kn}$ is the j-th class, a discriminant function $g_j$ (hereinafter this may be described as $g_j$ (•)) to calculate a similarity of the j-th class to a feature vector x may be the following function.

$$g_j(\vec{x}_{kn}; \vec{\alpha})$$ [Math 4]

At this time, the continuous loss calculation section 104 calculates the risk that the feature vector x causes a classification error using the following exemplified Expression 3 to Expression 6.

[Math 5]

$$r(\vec{x}_{kn}; \vec{\alpha}) = f(g_j(\vec{x}_{kn}; \vec{\alpha}) - g_k(\vec{x}_{kn}; \vec{\alpha}))$$ (Expression 3)

[Math 6]

$$r(\vec{x}_{kn}; \vec{\alpha}) = f(g_j(\vec{x}_{kn}; \vec{\alpha})/g_k(\vec{x}_{kn}; \vec{\alpha}))$$ (Expression 4)

[Math 7]

$$r(\vec{x}_{kn}; \vec{\alpha}) = f\left(\frac{g_j(\vec{x}_{kn}; \vec{\alpha})}{g_j(\vec{x}_{kn}; \vec{\alpha}) + g_k(\vec{x}_{kn}; \vec{\alpha})}\right)$$ (Expression 5)

[Math 8]

$$r(\vec{x}_{kn}; \vec{\alpha}) = f\left(\frac{g_j(\vec{x}_{kn}; \vec{\alpha}) - g_k(\vec{x}_{kn}; \vec{\alpha})}{g_j(\vec{x}_{kn}; \vec{\alpha}) + g_k(\vec{x}_{kn}; \vec{\alpha})}\right)$$ (Expression 6)

Herein, function f (hereinafter this may be described as f (•)) may be any monotone increasing function, and is defined as in Expression 7 exemplified below, for example.

[Math 9]

$$f(x) = \frac{1}{1 + \exp(-\beta(x + \xi))}$$ (Expression 7)

Herein, β and ξ are hyper parameters, to which desired values are set. Using a method similar to a method to set values in a typical classifier, values may set for β and ξ. In this way, the continuous loss calculation section 104 calculates the total sum of risks representing the degree of errors caused by the input vector x belonging to the class k, thereby calculating a continuous loss for the class k.

The above description deals with the case where the continuous loss calculation section 104 calculates the risks using the discriminant function $g_k$ to calculate a similarity of the k-th class to the feature vector x. Herein, the discriminant function $g_k$ used for risk calculation is not limited to the function to calculate a similarity of the k-th class to the feature vector x.

For instance, the continuous loss calculation section 104 may calculate the risks using a discriminant function to calculate a distance between the k-th class and the feature vector x. In this case, as a smaller output value is calculated using the discriminant function (i.e., they are closer to each other), the degree to belong to a target class increases. Accordingly the continuous loss calculation section 104 may calculate the risks using expressions where $g_k$(•) and $g_j$(•) exemplified in Expression 3 to Expression 6 are exchanged.

Next, the continuous loss calculation section 104 calculates a total sum of the continuous loss calculated for the classes. That is, let that the number of classes is K, the continuous loss calculation section 104 calculates the total sum of the continuous losses using Expression 8 exemplified as follows.

[Math 10]

$$\sum_{k=1}^{K} L_k(\vec{\alpha})$$ (Expression 8)

Next, the loss difference calculation section 105 calculates a total sum of differences of losses between the classes. For instance, the loss difference calculation section 105 calculates a total sum of differences of losses between the j-th class and the k-th class using Expression 9 exemplified as follows.

[Math 11]

$$\frac{1}{2}\sum_{j=1}^{K}\sum_{k=1}^{K}(L_j(\vec{\alpha})-L_k(\vec{\alpha}))^2 \qquad \text{(Expression 9)}$$

Next, the recognition dictionary determination section 109 determines a classifier parameter α so as to minimize a weighted linear sum of the total sum of continuous losses calculated by the continuous loss calculation section 104 and the total sum of the loss differences between classes calculated by the loss difference calculation section 105. For instance, the recognition dictionary determination section 109 determines a classifier parameter α so as to minimize a weighted linear sum of the total sum of continuous losses calculated by the continuous loss calculation section 104 using Expression 8 and the total sum of the loss differences between classes calculated by the loss difference calculation section 105 using Expression 9. At this time, the recognition dictionary determination section 109 may determine the classifier parameter cc so as to minimize value L(α) calculated using Expression 10 exemplified below.

[Math 12]

$$L(\vec{\alpha}) = \sum_{k=1}^{K}L_k(\vec{\alpha}) + \frac{\lambda}{2}\sum_{j=1}^{K}\sum_{k=1}^{K}(L_j(\vec{\alpha})-L_k(\vec{\alpha}))^2 \qquad \text{(Expression 10)}$$

Herein, λ denotes a hyper parameter. The recognition dictionary determination section 109 may determine the classifier parameter α so as to minimize L(α) by cross-validation, for example.

The classification section 106 performs classification processing of input data using the thus determined classifier parameter α. Accordingly, the determination of the classifier parameter α by the recognition dictionary determination section 109 means the creation of a recognition dictionary to be used for classification processing of input data.

When new data is input, the recognition dictionary determination section 109 corrects the classifier parameter α by the aforementioned method so as to minimize the evaluation value L(α) on the basis of the input new data. Based on this, it can be said that the recognition dictionary determination section 109 corrects the recognition dictionary so as to minimize the evaluation value L(α) on the basis of input data.

The data input section 101, the feature extraction section 102, the recognition dictionary creation section 103 (more specifically the continuous loss calculation section 104, the loss difference calculation section 105 and the recognition dictionary determination section 109), the classification section 106 and the result output section 108 may be implemented by a CPU of a computer that operates in accordance with a program (a pattern recognition program). For instance, when the program is stored in a storage section (not illustrated) of the pattern recognizer, the CPU reads the program and operates as the data input section 101, the feature extraction section 102, the recognition dictionary creation section 103 (more specifically the continuous loss calculation section 104, the loss difference calculation section 105 and the recognition dictionary determination section 109), the classification section 106 and the result output section 108. Alternatively, the data input section 101, the feature extraction section 102, the recognition dictionary creation section 103 (more specifically the continuous loss calculation section 104, the loss difference calculation section 105 and the recognition dictionary determination section 109), the classification section 106 and the result output section 108 may be implemented using their dedicated hardware.

Alternatively, the recognition dictionary creation section 103 (more specifically the continuous loss calculation section 104, the loss difference calculation section 105 and the recognition dictionary determination section 109) may operate as one device (a recognition dictionary creation device).

Figure 2:
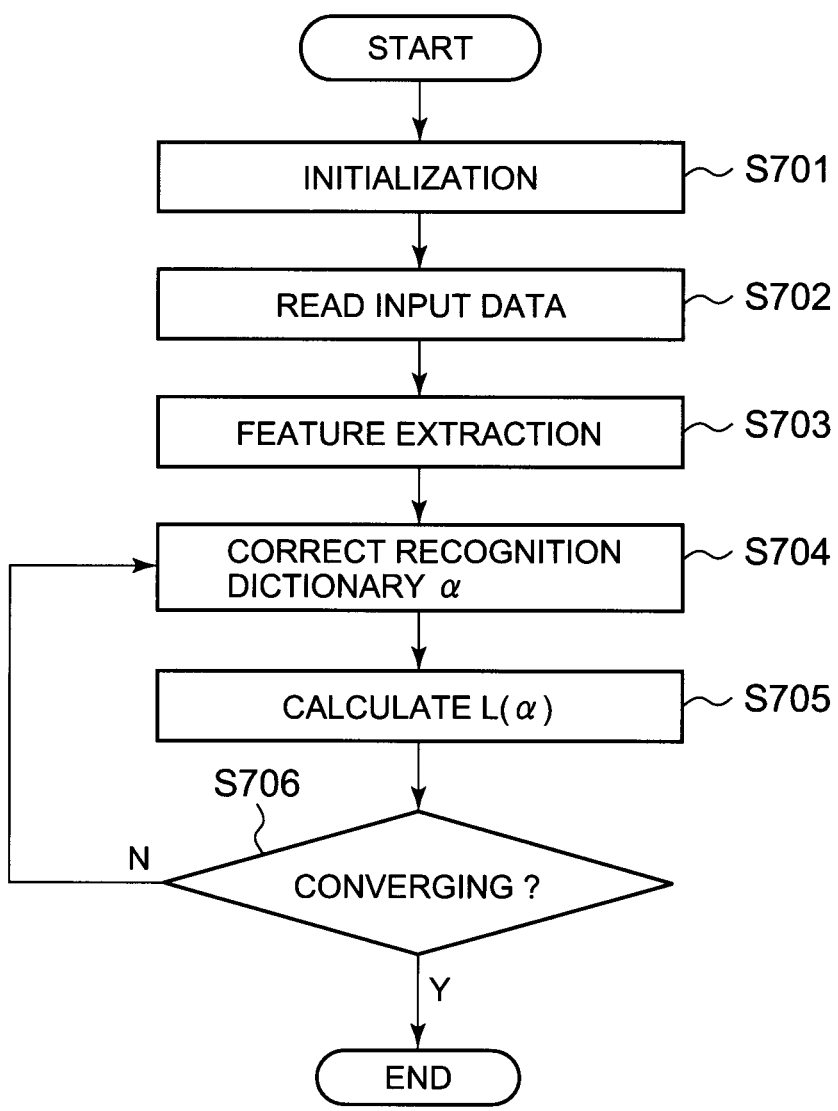
FIG. 2 It depicts a flowchart illustrating exemplary processing to create a recognition dictionary.

Next, the operation is described below. To begin with, the processing at the stage to create a recognition dictionary is described. FIG. 2 is a flowchart illustrating exemplary processing to create a recognition dictionary. In the following description, Expression 10 is used as the evaluation function. In the following description, to create a recognition dictionary may be referred to as learning.

Firstly, using a data set for learning (i.e., data set used to create a recognition dictionary), a recognition dictionary is initialized (Step S701). More specifically, the recognition dictionary creation section 103 sets an initial value of the classifier parameter α so that the pattern recognizer becomes ready for learning. Further the recognition dictionary creation section 103 sets a sufficient large value for a variable L to be a comparison target in the later processing.

Next, the data input section 101 reads input data (Step S702) and informs the feature extraction section 102 of the data. The feature extraction section 102 performs feature extraction from the input data, thus converting the input data into a d dimensional feature vector (Step S703). The recognition dictionary determination section 109 corrects a classifier parameter α as a recognition dictionary so as to decrease the evaluation function L(α) defined by Expression 10 (Step S704 and Step S705). More specifically, the recognition dictionary determination section 109 corrects the classifier parameter α so as to minimize a weighted linear sum of the total sum of continuous losses calculated by the continuous loss calculation section 104 and the total sum of the loss differences between classes calculated by the loss difference calculation section 105.

The recognition dictionary determination section 109 compares a value of the evaluation function L(α) with the value of the variable L. Then, when a difference between the value of the evaluation function L(α) and the value of the variable L is sufficiently small (i.e., converging to a constant value) (Yes at Step S706), the recognition dictionary determination section 109 determines α at this time as a classifier parameter to end the processing. On the other hand, when it cannot be said that the difference between the value of the evaluation function L(α) and the value of the variable L is sufficiently small (i.e., not converging to a constant value) (No at Step S706), the recognition dictionary determination section 109 substitutes the value of L(α) at this time into the variable L and then the processing of Step S704 or later is repeated.

Figure 3:
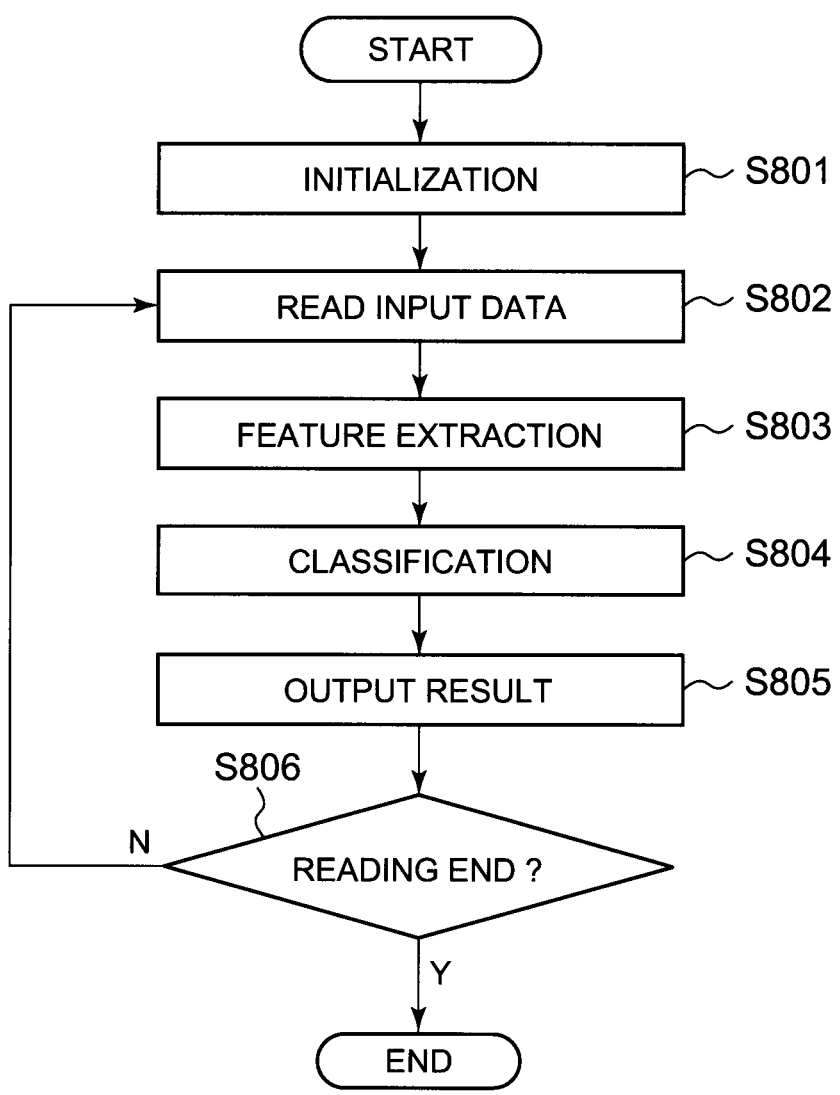
FIG. 3 It depicts a flowchart illustrating exemplary recognition processing using a recognition dictionary.

Next, the processing at the stage to recognize data is described below. FIG. 3 is a flowchart illustrating exemplary recognition processing using a recognition dictionary. Firstly, the classification section 106 initializes a recognition dictionary (Step S801). More specifically, the classification section 106 lets the recognition dictionary created by the recognition dictionary creation section 103 into an available state. Next, the data input section 101 reads input data (Step S802), and informs the feature extraction section 102 of the data. The feature extraction section 102 performs feature extraction from the input data, thus converting the input data into a d dimensional feature vector (Step S803). The classification section 106 uses the recognition dictionary to perform classification processing of the converted feature vector (Step S804), and informs the result output section 108 of a classification result. Then, the result output section 108 outputs the classification result received from the classification section 106 (Step S805).

The classification section 106 determines whether the reading of the input data ends or not (Step S806). When the reading of the input data does not end (No at Step S806), the processing of Step S802 or later is repeated. On the other hand, when the reading of the input data ends (Yes at Step S806), the classification section 106 ends the processing.

As state above, according to the present exemplary embodiment, the continuous loss calculation section 104 calculates, for each class, a continuous loss of a feature vector indicating a feature of data belonging to the class. Further the loss difference calculation section 105 calculates a total sum of loss differences between the classes on the basis of the loss calculated for each class. Then the recognition dictionary determination section 109 creates a recognition dictionary on the basis of the total sum of losses calculated for the classes and the total sum of loss differences between classes. The recognition dictionary determination section 109 further corrects the recognition dictionary so as to minimize a sum of the total sum of the losses calculated for the classes and the total sum of the loss differences between classes on the basis of an input feature vector. Then, the classification section 106 uses the corrected recognition dictionary to classify a data pattern. Therefore, even when data used for learning contains noise or the number of data is small, pattern recognition of not-learned new data can be performed with high-degree of classification precision.

That is, in the present exemplary embodiment, a recognition dictionary is determined so as to decrease the continuous loss and decrease loss differences between classes, and therefore even when data used for learning contains noise or the number of data is small, high-degree of classification precision can be realized for not-learned new data. Such an effect is described below in detail by way of specific examples. In the following specific example, for ease of explanation, the case of two classes is exemplified. When the number of classes is two, the aforementioned Expression 10 can be defined as the following Expression 11.

[Math 13]

$$L(\vec{\alpha})=L_1(\vec{\alpha})+L_2(\vec{\alpha})+\lambda(L_1(\vec{\alpha})-L_2(\vec{\alpha}))^2 \quad \text{(Expression 11)}$$

Figure 4:
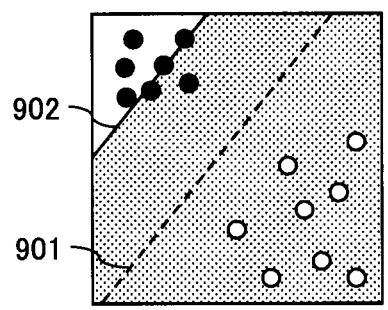
FIG. 4 It depicts an exemplary operation to determine a decision boundary.
Figure 5:
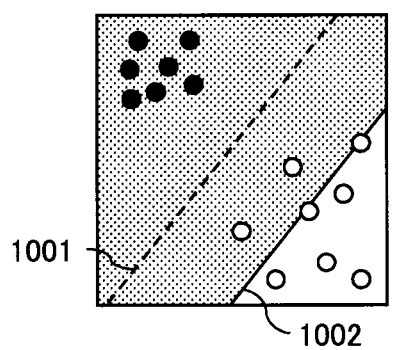
FIG. 5 It depicts an exemplary operation to determine a decision boundary.
Figure 18:
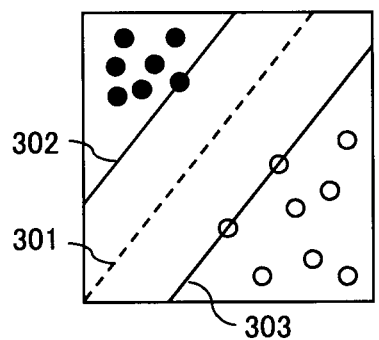
FIG. 18 It depicts the processing to create a recognition dictionary from data that can be linearly separated.
Figure 19:
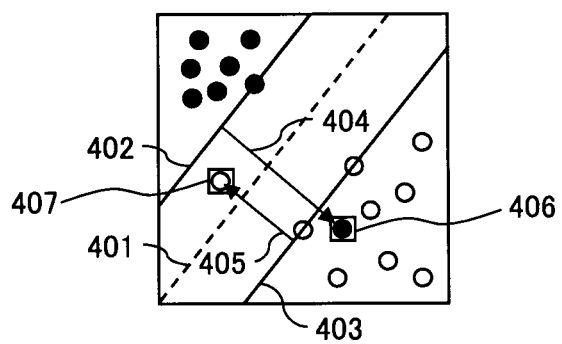
FIG. 19 It depicts the processing to create a recognition dictionary from data that cannot be linearly separated.

FIG. 4 and FIG. 5 illustrate an exemplary operation to determine a decision boundary for the data in the state illustrated in FIG. 18. In the following description, a black dot (hereinafter described as "●") in the drawing indicates data belonging to class 1 and an open circle (hereinafter described as "○") indicates data belonging to class 2. A broken line 901 of FIG. 4 represents a decision boundary set by a classifier. A solid line 902 represents a margin boundary set at a position of a certain constant distance ξ from the broken line 901 closer to class 1. The total sum of continuous losses of the data of "●" contained in the region indicated with shading in FIG. 4 becomes continuous loss $L_1(\alpha)$ of class 1.

Similarly, a broken line 1001 of FIG. 5 represents a decision boundary set at the same position as that of the broken line 901 of FIG. 4. A solid line 1002 represents a margin boundary similarly set at a position of a certain constant distance from the broken line 1001 closer to class 2. The total sum of continuous losses of the data of "○" contained in the region indicated with shading in FIG. 5 becomes continuous loss $L_2(\alpha)$ of class 2.

As illustrated in FIG. 4 and FIG. 5, the continuous loss $L_1(\alpha)$ of class 1 becomes smaller as the decision boundary becomes away from the data of class 1 indicated as "●". The continuous loss $L_2(\alpha)$ of class 2 becomes smaller as the decision boundary becomes away from the data of class 2 indicated as "○".

For ease of explanation, the following describes the case using Expression 2, Expression 3, Expression 7 and Expression 11. Herein, the value of the priori probability in Expression 2 is $P_k=N_k$, and a sufficient large value is set for the value of β in Expression 7. In this case, the continuous loss $L_1(\alpha)$ of class 1 approximately equals the number of "●" contained in the shaded region of FIG. 4, and the continuous loss $L_2(\alpha)$ of class 2 approximately equals the number of "○" contained in the shaded region of FIG. 5.

Herein, to find α so as to minimize the first term and the second term of the right side of Expression 11 means to find a decision boundary to minimize the total sum of them (i.e., the continuous losses). Further, to find α so as to minimize the third term of the right side of Expression 11 means to find a decision boundary where the number of "●" contained in the shaded region of FIG. 4 equals the number of "○" contained in the shaded region of FIG. 5. Accordingly, when the value of λ in Expression 11 is sufficiently large, a decision boundary will be found so as to minimize the total sum of the number of "●" contained in the shaded region of FIG. 4 and the number of "○" contained in the shaded region of FIG. 5 under the condition that the number of "●" and the number of "○" become equal to each other.

Figure 6:
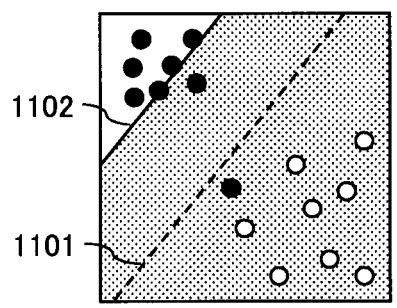
FIG. 6 It depicts an exemplary operation to determine a decision boundary.
Figure 7:
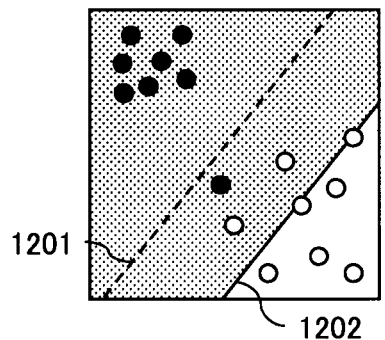
FIG. 7 It depicts an exemplary operation to determine a decision boundary.
Figure 20:
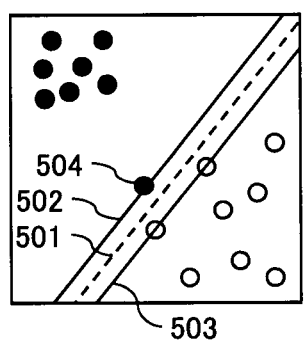
FIG. 20 It depicts a set of data that cannot be linearly separated.

FIG. 6 and FIG. 7 illustrate an exemplary operation to determine a decision boundary for the data in the state illustrated in FIG. 20. In the example illustrated in FIG. 6 and FIG. 7, data of class 1 indicated with "●" is added to the close vicinity of data of class 2 indicated with "○". In such a case as well, a decision boundary will be determined so as to minimize the total sum of the number of "●" contained in the shaded region of FIG. 6 and the number of "○" contained in the shaded region of FIG. 7 under the condition that the number of "●" and the number of "○" become equal to each other. That is, the decision boundary will be set at the position of a broken line 1101 of FIG. 6 or a broken line 1201 of FIG. 7.

Figure 21:
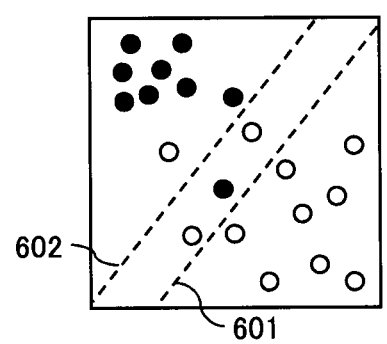
FIG. 21 It depicts the case where not-learned new data is added to a data set.

Accordingly, even when new data is input as exemplified in FIG. 21, for example, a decision boundary can be determined with higher classification precision than classification precision found by a typical pattern recognizer. That is, higher-degree of classification precision can be achieved.

Figure 8:
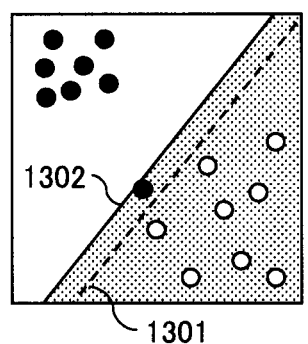
FIG. 8 It depicts an exemplary operation to determine a decision boundary.
Figure 9:
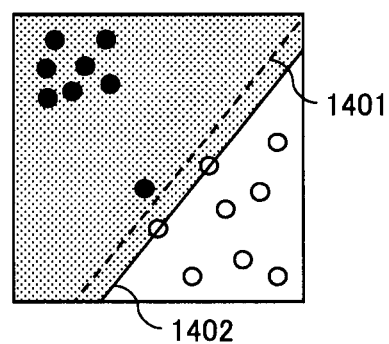
FIG. 9 It depicts an exemplary operation to determine a decision boundary.

Further according to the present exemplary embodiment, the distance between the decision boundary and the margin boundary is made small, whereby a decision boundary similar to the decision boundary determined by a typical pattern recognizer can be obtained. This is described as follows with reference to FIG. 8 and FIG. 9. FIG. 8 and FIG. 9 illustrate another exemplary operation to determine a decision boundary for the data in the state illustrated in FIG. 20.

When the value of the distance ξ is made small, the number of "●" contained in the shaded region of FIG. 8 and the number of "○" contained in the shaded region of FIG. 9 are accordingly made small. Therefore, a decision boundary (a broken line 1301 of FIG. 8 or a broken line 1401 of FIG. 9) will be set at a position strongly depending on the data existing in the vicinity of the decision boundary, and so a result similar to the decision boundary (the broken line 601 of FIG. 21, for example) determined by a typical pattern recognizer can be obtained.

EXAMPLES

The following describes the present invention by way of specific examples. The scope of the present invention is not limited to the below description. In the following description, assume that the number of classes is 2 and a kernel discriminant function is used as a discriminant function for each class. That is, the discriminant function of class k is defined as in Expression 12 exemplified below.

[Math 14]

$$g_k(\vec{x}_{kn}; \vec{\alpha}) = \sum_{i=1}^{N_k} \alpha_{ki} K(\vec{x}_{kn}, \vec{x}_{ki})$$ (Expression 12)

Herein, vector $x_{ki}$ is learning data belonging to class k, and $\alpha_{ki}$ is a classifier parameter. K is a kernel function (hereinafter this may be described as K(•)), and a Gaussian kernel function defined as in Expression 13 exemplified below or the like may be used.

[Math 15]

$$K(\vec{x}, \vec{y}) = \exp(-\gamma \|\vec{x} - \vec{y}\|^2)$$ (Expression 13)

Herein, $\gamma$ ($\gamma > 0$) is a parameter specifying the magnitude of Gaussian kernel, and a desired value may be set for $\gamma$ in advance. In the present example, Expression 2 and Expression 6 are used as expressions to calculate a continuous loss for the k-th class. Expression 11 is used as the evaluation function.

In the present example, firstly, the processing at the stage to create a recognition dictionary is described. Firstly, a plurality of pieces of input data is prepared for learning, and each piece of input data is converted into a d dimensional feature vector (hereinafter described as an input vector). Hereinafter for ease of explanation, input vectors belonging to class 1 are denoted as (x[1], x[2], . . . , x[N1]), and input vectors belonging to class 2 are denoted as (x[N1+1], x[N1+2], . . . , x[N1+N2]).

A desired value is set as the priori probability $P_k$ of Expression 2. For instance, the priori probability $P_1$ of class 1 is set as $P_1 = N1/N$ and the priori probability $P_2$ of class 2 is set as $P_2 = N2/N$. Herein, N denotes the total number of input vectors, and N=N1+N2 holds.

Further, ($\alpha[1], \alpha[2], \ldots \alpha[N1]$) is prepared for a recognition dictionary relating to class 1, and ($\alpha[N1+1], \alpha2[N1+2], \ldots \alpha2[N1+N2]$) is prepared for a recognition dictionary relating to class 2, and 1 is set for all values. Further, a minute value $\epsilon$ is prepared to indicate a change amount of a parameter value, and 0.01 may be set as the value of this $\epsilon$, for example.

Figure 10:
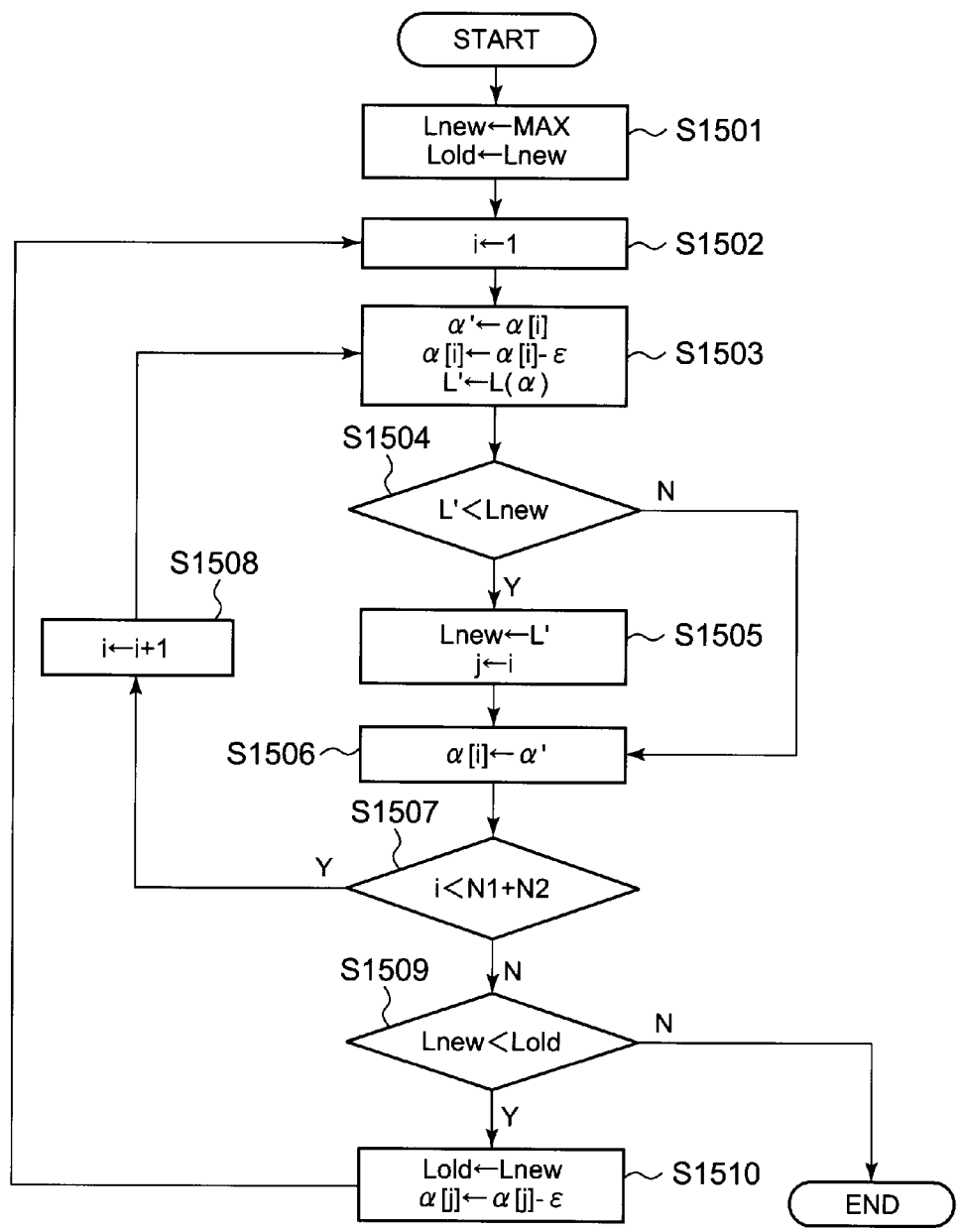
FIG. 10 It depicts a flowchart illustrating exemplary processing to create a recognition dictionary.

FIG. 10 is a flowchart illustrating exemplary processing to create a recognition dictionary in the present example. Firstly, sufficient large values are set for variables $L_{new}$ and $L_{old}$ (Step S1501), and further 1 is set for variable i (Step S1502). The recognition dictionary creation section 103 stores the value of the i-th parameter $\alpha[i]$ as variable $\alpha'$ and decreases $\alpha[i]$ by $\epsilon$. Thereafter the recognition dictionary creation section 103 calculates the evaluation value $L(\alpha)$ of Expression 11 and stores the same as variable L' (Step S1503). When the value of the variable L' is not smaller than the variable $L_{new}$ (No at Step S1504), the procedure proceeds to Step S1506. On the other hand, when the value of the variable L' is smaller than the variable $L_{new}$ (Yes at Step S1504), the procedure proceeds to Step S1505. At Step S1505, the recognition dictionary creation section 103 stores the value of the variable L' as the variable $L_{new}$ and the value of the variable i as a variable j (Step S1505).

Next, the recognition dictionary creation section 103 returns the value stored as the variable $\alpha'$ to $\alpha[i]$ (Step S1506). When the value of the variable i is smaller than the total number N1+N2 (Yes at Step S1507), the recognition dictionary creation section 103 increases the value of i by 1 (Step S1508), and thereafter the procedure returns to S1503 to repeat the following processing. On the other hand, when the value of the variable i is not smaller than the total number N1+N2 at Step S1507 (No at Step S1507), the procedure proceeds to S1509.

When the value of the variable $L_{new}$ is not smaller than $L_{old}$ (No at Step S1509), the processing ends. On the other hand, when the value of the variable $L_{new}$ is smaller than $L_{old}$ (Yes at Step S1509), the processing proceeds to Step S1510. At Step S1510, the recognition dictionary creation section 103 stores the value of $L_{new}$ as $L_{old}$, and changes the value of the j-th parameter $\alpha[j]$ so as to decrease by $\epsilon$ (Step S1510). Then the procedure returns to Step S1502 and the following processing is repeated.

Herein, the processing to calculate the evaluation value $L(\alpha)$ at Step S1503 is described below. As exemplified in Expression 11, the value of the evaluation value $L(\alpha)$ can be obtained by calculating the continuous losses $L_1(\alpha)$ and $L_2(\alpha)$ of class 1 and class 2, respectively.

Figure 11:
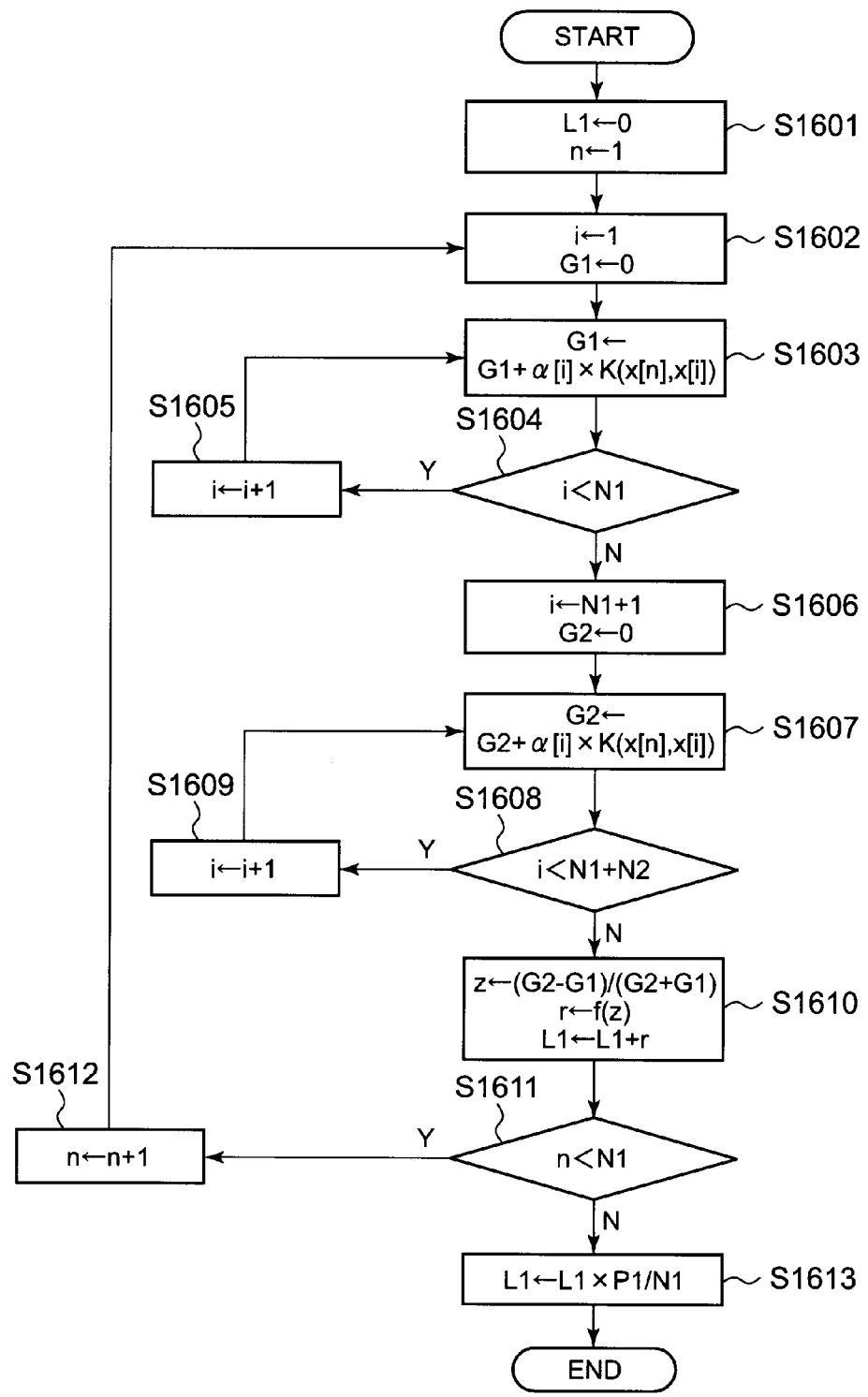
FIG. 11 It depicts a flowchart illustrating exemplary processing to calculate a continuous loss of class 1.

Firstly, the processing to find the continuous loss $L_1(\alpha)$ of class 1 is described referring to the flowchart. FIG. 11 is a flowchart illustrating exemplary processing to calculate the continuous loss of class 1.

To begin with, the recognition dictionary creation section 103 sets the value of the variable L1 at 0 and the value of the variable n at 1 (Step S1601). Further the recognition dictionary creation section 103 sets the value of the variable i at 1 and the value of the variable G1 at 0 (Step S1602). Next, the recognition dictionary creation section 103 calculates a value of the kernel function exemplified in Expression 13 using the input vector x[n] and x[i], and adds, to the variable G1, the value obtained by multiplying the calculation result by the i-th parameter $\alpha[i]$ (Step S1603).

Herein, when the value of the variable i is smaller than N1 (Yes at Step S1604), the recognition dictionary creation section 103 increases the value of the variable i by 1 (Step S1605), and the procedure returns to Step S1603 to repeat the following processing. On the other hand, when the value of the variable i is not smaller than N1 (No at Step S1604), the procedure proceeds to Step S1606. At Step S1606, the recognition dictionary creation section 103 sets the value of i at N1+1 and the value of G2 at 0 (Step S1606).

Next, the recognition dictionary creation section 103 calculates a value of the kernel function exemplified in Expression 13 using the input vector x[n] and x[i], and adds, to the variable G2, the value obtained by multiplying the calculation result by the i-th parameter $\alpha[i]$ (Step S1607). Herein, when the value of the variable i is smaller than N1+N2 (Yes at Step S1608), the recognition dictionary creation section 103 increases the value of the variable i by 1 (Step S1609), and the procedure returns to Step S1607 to repeat the following processing. On the other hand, when the value of the variable i is not smaller than N1+N2 (No at Step S1608), the procedure proceeds to Step S1610.

The value set for the variable G1 is the value of the discriminant function of class 1, and the value set for the variable G2 is the value of the discriminant function of class 2. Then, the recognition dictionary creation section 103 finds a continuous loss relating to the input vector x[n] belonging to class 1 in accordance with Expression 6 (Step S1610). When the value of the variable n is smaller than N1 (Yes at Step S1611), the recognition dictionary creation section 103 increases the value of the variable n by 1 (Step S1612) and the procedure returns to Step S1602 to repeat the following processing. On the other hand, when the value of the variable n is not smaller than N1 (No at Step S1611), the procedure proceeds to Step S1613.

The recognition dictionary creation section 103 calculates a value by multiplying the variable L1 by the priori probability $P_1$ set at a desired value in accordance with Expression 2, and further sets, as the variable L1, the value obtained by dividing the calculation result by the number of input vectors N1 of class 1 (S1613). Thereafter the procedure ends.

Figure 12:
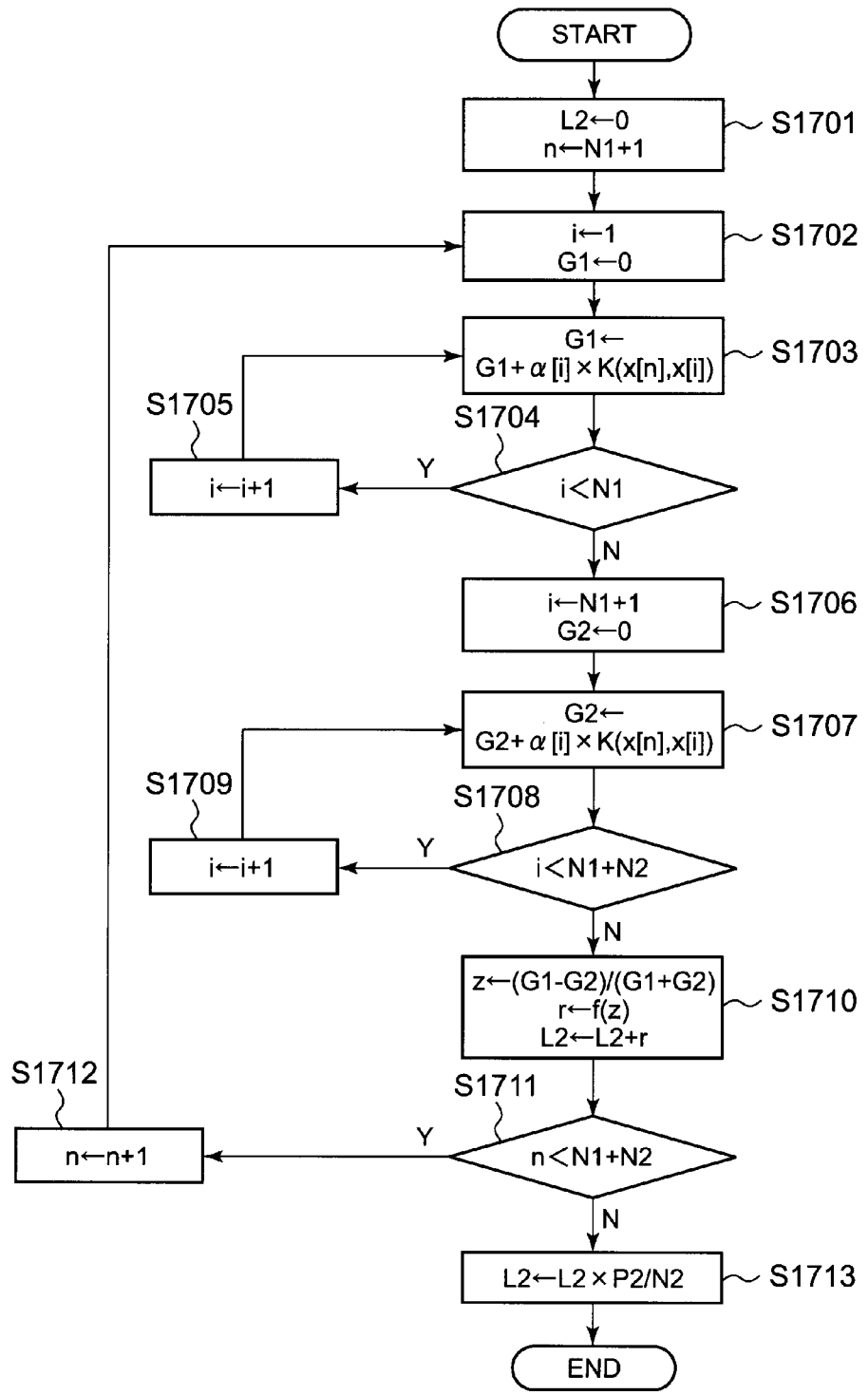
FIG. 12 It depicts a flowchart illustrating exemplary processing to calculate a continuous loss of class 2.

Next, the processing to find the continuous loss $L_2(\alpha)$ of class 2 is described referring to the flowchart. FIG. 12 is a flowchart illustrating exemplary processing to calculate the continuous loss of class 2.

To begin with, the recognition dictionary creation section 103 sets the value of the variable L2 at 0 and the value of the variable n at N1+1(Step S1701). Further the recognition dictionary creation section 103 sets the value of the variable i at 1 and the value of the variable G1 at 0 (Step S1702). Next, the recognition dictionary creation section 103 calculates a value of the kernel function exemplified in Expression 13 using the input vector x[n] and x[i], and adds, to the variable G1, the value obtained by multiplying the calculation result by the i-th parameter $\alpha[i]$ (Step S1703).

Herein, when the value of the variable i is smaller than N1 (Yes at Step S1704), the recognition dictionary creation section 103 increases the value of the variable i by 1 (Step S1705), and the procedure returns to Step S1703 to repeat the following processing. On the other hand, when the value of the variable i is not smaller than N1 (No at Step S1704), the procedure proceeds to Step S1706. At Step S1706, the recognition dictionary creation section 103 sets the value of i at N1+1 and the value of G2 at 0 (Step S1706).

Next, the recognition dictionary creation section 103 calculates a value of the kernel function exemplified in Expression 13 using the input vector x[n] and x[i], and adds, to the variable G2, the value obtained by multiplying the calculation result by the i-th parameter $\alpha[i]$ (Step S1707). Herein, when the value of the variable i is smaller than N1+N2 (Yes at Step S1708), the recognition dictionary creation section 103 increases the value of the variable i by 1 (Step S1709), and the procedure returns to Step S1707 to repeat the following processing. On the other hand, when the value of the variable i is not smaller than N1+N2 (No at Step S1708), the procedure proceeds to Step S1710.

Similarly to the case of class 1, the value set for the variable G1 is the value of the discriminant function of class 1, and the value set for the variable G2 is the value of the discriminant function of class 2. Then, the recognition dictionary creation section 103 finds a continuous loss relating to the input vector x[n] belonging to class 2 in accordance with Expression 6 (Step S1710). When the value of the variable n is smaller than N1+N2 (Yes at Step S1711), the recognition dictionary creation section 103 increases the value of the variable n by 1 (Step S1712) and the procedure returns to Step S1702 to repeat the following processing. On the other hand, when the value of the variable n is not smaller than N1+N2 (No at Step S1711), the procedure proceeds to Step S1713.

The recognition dictionary creation section 103 calculates a value by multiplying the variable L2 by the priori probability $P_2$ set at a desired value in accordance with Expression 2, and further sets, as the variable L2, the value obtained by dividing the calculation result by the number of input vectors N2 of class 2 (S1713). Thereafter the procedure ends.

Figure 13:
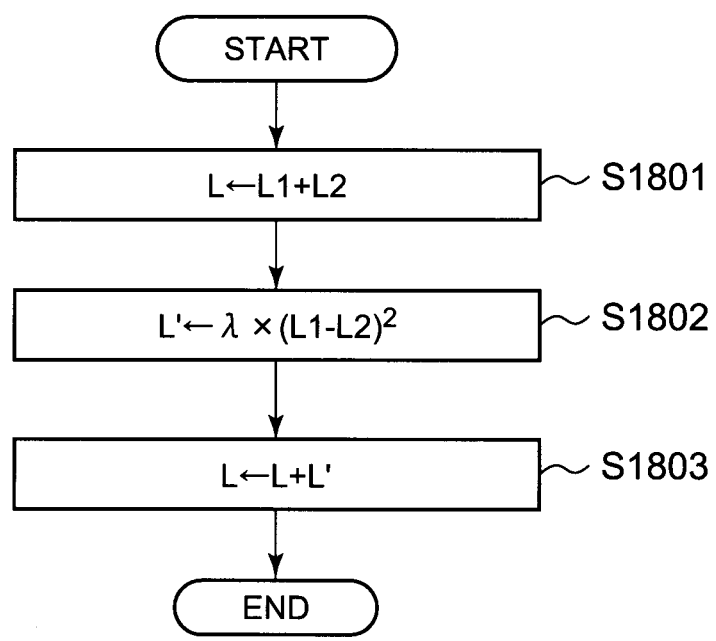
FIG. 13 It depicts a flowchart illustrating exemplary processing to calculate an evaluation value.

Next, the processing to find the evaluation value $L(\alpha)$ is described referring to the flowchart. FIG. 13 is a flowchart illustrating exemplary processing to calculate the evaluation value. The following describes the case to find the evaluation value $L(\alpha)$ in accordance with Expression 11.

To begin with, the recognition dictionary creation section 103 sets, as the variable L, a value obtained by adding the variable L1 and the variable L2 calculated by the aforementioned processing (Step S1801). Further the recognition dictionary creation section 103 sets, as the variable L', a value obtained by multiplying the square of a difference between the variable L1 and the variable L2 calculated by the aforementioned processing by a desired value $\lambda$ (Step S1802). Then the recognition dictionary creation section 103 sets, as the variable L, a value obtained by adding the value set as the variable L at Step S1801 and the value set as the variable L' at Step S1802 (Step S1803), and the procedure ends. The thus obtained value of L is used as the evaluation value $L(\alpha)$ at Step S1503 of FIG. 10.

That is the description of the processing at the stage to create a recognition dictionary. Next, the following describes the processing at the stage to recognize data using a recognition dictionary. Assume herein that input data is converted into a d dimensional feature vector x by predetermined feature extraction. Hereinafter the thus converted feature vector is described as an input vector.

Figure 14:
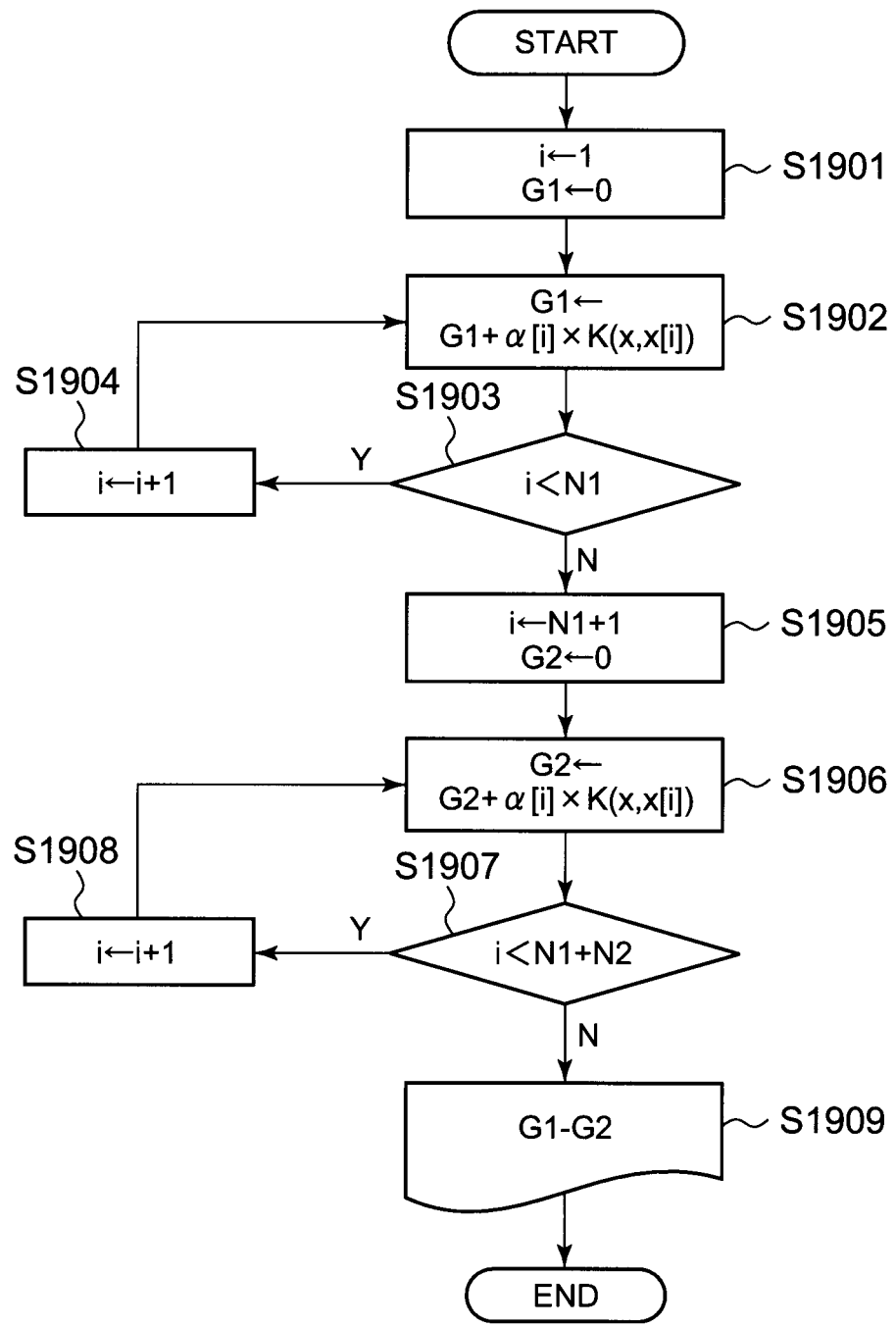
FIG. 14 It depicts a flowchart illustrating exemplary classification processing performed to one piece of input data.

FIG. 14 is a flowchart illustrating exemplary classification processing performed to one piece of input data. To begin with, the classification section 106 sets the value of the variable i at 1 and the value of the variable G1 at 0 (Step S1901). Next, the classification section 106 calculates a value of the kernel function exemplified in Expression 13 using the input vector x and x[i], and adds, to the variable G1, the value obtained by multiplying the calculation result by the i-th parameter $\alpha[i]$ (Step S1902).

Herein, when the value of the variable i is smaller than N1 (Yes at Step S1903), the classification section 106 increases the value of the variable i by 1 (Step S1904), and the procedure returns to Step S1902 to repeat the following processing. On the other hand, when the value of the variable i is not smaller than N1 (No at Step S1903), the procedure proceeds to Step S1905. At Step S1905, the classification section 106 sets the value of i at N1+1 and the value of G2 at 0 (Step S1905).

Next, the classification section 106 calculates a value of the kernel function exemplified in Expression 13 using the input vector x and x[i], and adds, to the variable G2, the value obtained by multiplying the calculation result by the i-th parameter $\alpha[i]$ (Step S1906). Herein, when the value of the variable i is smaller than N1+N2 (Yes at Step S1907), the classification section 106 increases the value of the variable i by 1 (Step S1908), and the procedure returns to Step S1906 to repeat the following processing. On the other hand, when the value of the variable i is not smaller than N1+N2 (No at Step S1907), the procedure proceeds to Step S1909.

Finally the classification section 106 outputs the value obtained by subtracting the value of the variable G2 from the value of the variable G1 (i.e., the value of G1−G2) and identifies the class to which the input vector belongs to end the processing (Step S1909). Herein, when the output value is positive, the input vector x is classified as belonging to class 1. On the other hand, when the output value is not positive, the input vector x is classified as belonging to class 2.

The present example describes the case where the number of classes is 2. The number of classes is not limited to 2, and it may be 3 or more. The present example describes the case where the classifier uses the kernel function defined by Expression 13. The function that the classifier uses is not limited to the kernel function.

Figure 15:
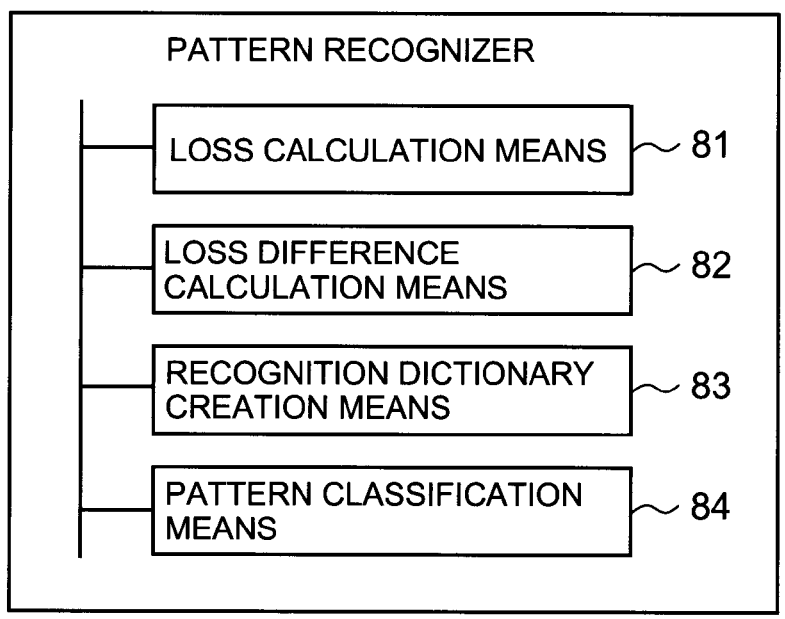
FIG. 15 It depicts a block diagram illustrating an exemplary minimum configuration of a pattern recognizer according to the present invention.

The following describes an example of the minimum configuration of a pattern recognizer according to the present invention. FIG. 15 is a block diagram illustrating an exemplary minimum configuration of a pattern recognizer according to the present invention. A pattern recognizer according to the present invention includes: loss calculation means 81 (e.g., continuous loss calculation section 104) that calculates (e.g., calculates using Expression 8) a loss (e.g., a continuous loss) of a feature vector for each class, the feature vector indicating a feature of data belonging to the class; loss difference calculation means 82 (e.g., loss difference calculation section 105) that calculates (e.g., calculates using Expression 9) a total sum of differences of losses between the classes on a basis of the loss calculated for each class; recognition dictionary creation means 83 (e.g., recognition dictionary determination section 109) that creates a recognition dictionary (e.g., determine a classifier parameter $\alpha$) on a basis of a total sum of losses (e.g., a total sum of continuous losses calculated using Expression 8) calculated for the classes by the loss calculation means 81 and the total sum of loss differences between the classes (e.g., a total sum of loss differences between classes calculated using Expression 9); and pattern classification means 84 (e.g., classification section 106) that classifies a pattern of data using the recognition dictionary.

The recognition dictionary creation means 83 corrects, on a basis of an input feature vector, a recognition dictionary so as to minimize a sum (e.g., evaluation value $L(\alpha)$ of the evaluation function defined by Expression 10) of the total sum of losses for the classes calculated by the loss calculation means 81 and the total sum of loss differences between the classes calculated by the loss difference calculation means 82, and the pattern classification means 84 classifies a pattern of data using the corrected recognition dictionary.

With this configuration, even when data used for learning contains noise or the number of data is small, pattern recognition of not-learned new data can be performed with high degree of classification precision.

Figure 16:
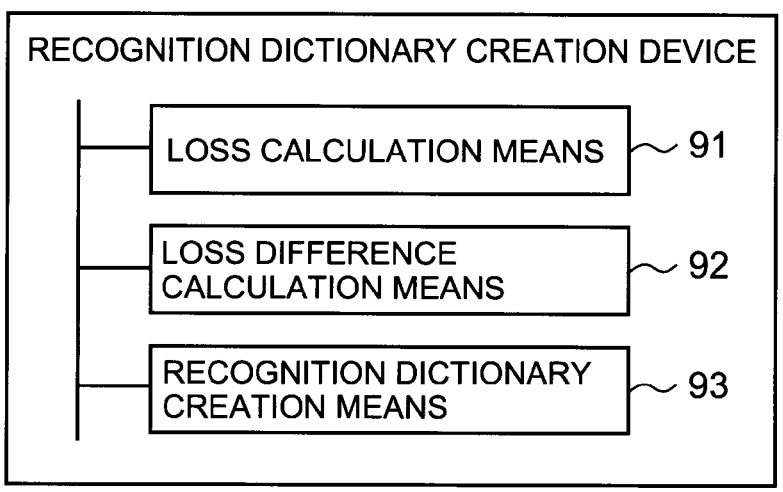
FIG. 16 It depicts a block diagram illustrating an exemplary minimum configuration of a recognition dictionary creation device according to the present invention.
Figure 17:
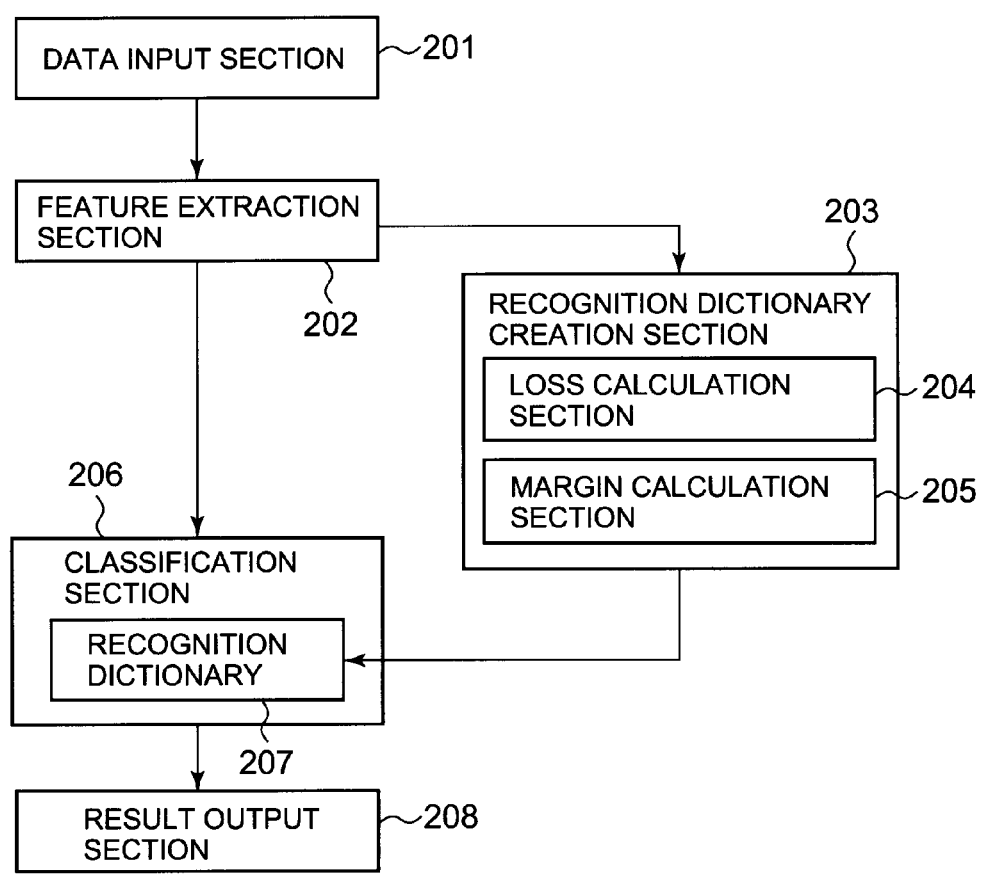
FIG. 17 It depicts a typical pattern recognizer.

The following describes an example of the minimum configuration of a recognition dictionary creation device according to the present invention. FIG. 16 is a block diagram illustrating an exemplary minimum configuration of a recognition dictionary creation device according to the present invention. A recognition dictionary creation device according to the present invention creates a recognition dictionary that a pattern recognizer uses, the pattern recognizer being configured to recognize a pattern of data. The recognition dictionary creation device includes: loss calculation means 91 (e.g., continuous loss calculation section 104) that calculates (e.g., calculates using Expression 8) a loss (e.g., a continuous loss) of a feature vector for each class, the feature vector indicating a feature of data belonging to the class; loss difference calculation means 92 (e.g., loss difference calculation section 105) that calculates (e.g., calculates using Expression 9) a total sum of differences of losses between the classes on a basis of the loss calculated for each class; and recognition dictionary creation means 93 (e.g., recognition dictionary determination section 109) that creates a recognition dictionary (e.g., determine a classifier parameter $\alpha$) on a basis of a total sum of losses (e.g., a total sum of continuous losses calculated using Expression 8) calculated for the classes by the loss calculation means 91 and the total sum of loss differences between the classes (e.g., a total sum of loss difference between classes calculated using Expression 9).

The recognition dictionary creation means 93 corrects, on a basis of an input feature vector, a recognition dictionary so as to minimize a sum (e.g., evaluation value $L(\alpha)$ of the evaluation function defined by Expression 10) of the total sum of losses for the classes calculated by the loss calculation means 91 and the total sum of loss differences between the classes calculated by the loss difference calculation means 92.

Since pattern recognition is performed using the thus created recognition dictionary, even when data used for learning contains noise or the number of data is small, pattern recognition of not-learned new data can be performed with high degree of classification precision.

Note here that at least the below-described pattern recognizer and recognition dictionary creation device also are disclosed in any of the aforementioned exemplary embodiments.

(1) A pattern recognizer includes: loss calculation means (e.g., continuous loss calculation section 104) that calculates (e.g., calculates using Expression 8) a loss (e.g., a continuous loss) of a feature vector for each class, the feature vector indicating a feature of data belonging to the class; loss difference calculation means (e.g., loss difference calculation section 105) that calculates (e.g., calculates using Expression 9) a total sum of differences of losses between the classes on a basis of the loss calculated for each class; recognition dictionary creation means (e.g., recognition dictionary determination section 109) that creates a recognition dictionary (e.g., determine a classifier parameter $\alpha$) on a basis of a total sum of losses (e.g., a total sum of continuous losses calculated using Expression 8) calculated for the classes by the loss calculation means and the total sum of loss differences between the classes (e.g., a total sum of loss difference between classes calculated using Expression 9); and pattern classification means (e.g., classification section 106) that classifies a pattern of data using the recognition dictionary. The recognition dictionary creation means corrects, on a basis of an input feature vector, a recognition dictionary so as to minimize a sum (e.g., evaluation value $L(\alpha)$ of the evaluation function defined by Expression 10) of the total sum of losses for the classes calculated by the loss calculation means and the total sum of loss differences between the classes calculated by the loss difference calculation means, and the pattern classification means classifies a pattern of data using the corrected recognition dictionary.

(2) In the pattern recognizer, the loss calculation means calculates a loss for each class on a basis of a total sum (e.g., a total sum of risks calculated by Expression 2) of risks (e.g., risks calculated by Expression 3 to Expression 6 and Expression 7) indicating a degree of a classification error of a class to which a feature vector belongs.

(3) In the pattern recognizer, the loss calculation means calculates (e.g., calculates using Expression 12 and Expression 13) a loss for each class using a kernel function, and the pattern classification means classifies a pattern of data using a recognition dictionary created on a basis of the kernel function.

(4) The pattern recognizer further includes feature vector extraction means (e.g., feature extraction section 102) that extracts a feature vector from data input as data to be recognized. The loss calculation means calculates a loss of a feature vector extracted by the feature vector extraction means for each class, and the pattern classification means classifies a pattern of a feature vector extracted by the feature vector extraction means using a recognition dictionary.

(5) A recognition dictionary creation device creates a recognition dictionary that a pattern recognizer uses, the pattern recognizer being configured to recognize a pattern of data. The recognition dictionary creation device includes: loss calculation means (e.g., continuous loss calculation section 104) that calculates (e.g., calculates using Expression 8) a loss (e.g., a continuous loss) of a feature vector for each class, the feature vector indicating a feature of data belonging to the class; loss difference calculation means (e.g., loss difference calculation section 105) that calculates (e.g., calculates using Expression 9) a total sum of differences of losses between the classes on a basis of the loss calculated for each class; and recognition dictionary creation means (e.g., recognition dictionary determination section 109) that creates a recognition dictionary (e.g., determine a classifier parameter α) on a basis of a total sum of losses (e.g., a total sum of continuous losses calculated using Expression 8) calculated for the classes by the loss calculation means and the total sum of loss differences between the classes (e.g., a total sum of loss difference between classes calculated using Expression 9). The recognition dictionary creation means corrects, on a basis of an input feature vector, a recognition dictionary so as to minimize a sum (e.g., evaluation value L(α) of the evaluation function defined by Expression 10) of the total sum of losses for the classes calculated by the loss calculation means and the total sum of loss differences between the classes calculated by the loss difference calculation means.

(6) In the recognition dictionary creation device, the loss calculation means calculates a loss for each class on a basis of a total sum (e.g., a total sum of risks calculated by Expression 2) of risks (e.g., risks calculated by Expression 3 to Expression 6 and Expression 7) indicating a degree of a classification error of the class to which a feature vector belongs.

While the invention has been particularly shown and described with reference to exemplary embodiments and examples thereof, the invention is not limited to these exemplary embodiments and examples. It will be understood by those of ordinary skill in the art that various changes in form and details may be made therein without departing from the spirit and scope of the present invention as defined by the claims.

This application is based upon and claims the benefit of priority from Japanese patent application No. 2010-5447, filed on Jan. 14, 2010, the disclosure of which is incorporated herein in its entirety by reference.

(Supplementary note 1) A pattern recognition method includes the steps of: extracting a feature vector from data input as data to be recognized, calculating a loss of the extracted feature vector for each class, and classifying a pattern of the extracted feature vector using a recognition dictionary.

(Supplementary note 2) A pattern recognition program makes a computer execute the processing including: feature vector extraction processing to extract a feature vector from data input as data to be recognized. In the loss calculation processing, a loss of the feature vector extracted in the feature vector extraction processing is calculated for each class. In the pattern classification processing, a pattern of the feature vector extracted in the feature vector extraction processing is classified using a recognition dictionary.

INDUSTRIAL APPLICABILITY

The present invention is preferably used for a pattern recognizer that recognizes a pattern of input data. For instance, a pattern recognizer of the present invention is preferably used for image recognition.

REFERENCE SIGNS LIST 101 data input section
102 feature extraction section
103 recognition dictionary creation section
104 continuous loss calculation section
105 loss difference calculation section
106 classification section
107 recognition dictionary
108 result output section
109 recognition dictionary determination section

The invention claimed is:

1. A pattern recognizer comprising:
a loss calculation unit that calculates a loss of a feature vector for each class, the feature vector indicating a feature of data belonging to the class;
a loss difference calculation unit that calculates a total sum of differences of losses between the classes on a basis of the loss calculated for each class;
a recognition dictionary creation unit that creates a recognition dictionary on a basis of a total sum of losses calculated for the classes by the loss calculation unit and the total sum of loss differences between the classes; and
a pattern classification unit that classifies a pattern of data using the recognition dictionary,
wherein
the recognition dictionary creation unit corrects, on a basis of an input feature vector, a recognition dictionary so as to minimize a sum of the total sum of losses for the classes calculated by the loss calculation unit and the total sum of loss differences between the classes calculated by the loss difference calculation unit, and
the pattern classification unit classifies a pattern of data using the corrected recognition dictionary.

2. The pattern recognizer according to claim 1, wherein the loss calculation unit calculates a loss for each class on a basis of a total sum of risks indicating a degree of a classification error of a class to which a feature vector belongs.

3. The pattern recognizer according to claim 1, wherein
the loss calculation unit calculates a loss for each class using a kernel function, and
the pattern classification unit classifies a pattern of data using a recognition dictionary created on a basis of the kernel function.

4. The pattern recognizer according to claim 1, further comprising a feature vector extraction unit that extracts a feature vector from data input as data to be recognized, wherein
the loss calculation unit calculates a loss of a feature vector extracted by the feature vector extraction unit for each class, and
the pattern classification unit classifies a pattern of a feature vector extracted by the feature vector extraction unit using a recognition dictionary.

5. A recognition dictionary creation device that creates a recognition dictionary that a pattern recognizer uses, the pattern recognizer being configured to recognize a pattern of data, comprising:
a loss calculation unit that calculates a loss of a feature vector for each class, the feature vector indicating a feature of data belonging to the class;
a loss difference calculation unit that calculates a total sum of differences of losses between the classes on a basis of the loss calculated for each class; and
a recognition dictionary creation unit that creates a recognition dictionary on a basis of a total sum of losses calculated for the classes by the loss calculation unit and the total sum of loss differences between the classes;
wherein
the recognition dictionary creation unit corrects, on a basis of an input feature vector, a recognition dictionary so as to minimize a sum of the total sum of losses for the classes calculated by the loss calculation unit and the total sum of loss differences between the classes calculated by the loss difference calculation unit.

6. The recognition dictionary creation device according to claim 5, wherein the loss calculation unit calculates a loss for each class on a basis of a total sum of risks indicating a degree of a classification error of a class to which a feature vector belongs.

7. A pattern recognition method, comprising the steps of:
calculating a loss of a feature vector for each class, the feature vector indicating a feature of data belonging to the class;
calculating a total sum of differences of losses between the classes on a basis of the loss calculated for each class;
creating a recognition dictionary on a basis of a total sum of losses calculated for the classes and the total sum of differences of losses between the classes;
correcting, on a basis of an input feature vector, a recognition dictionary so as to minimize a sum of the total sum of losses calculated for the classes and the total sum of differences of losses between the classes, and
classifying a pattern of data using the corrected recognition dictionary.

* * * * *